Nov. 1, 1949.  J. HARRIS  2,486,472
AIR CONDITIONING APPARATUS
Filed May 16, 1947  8 Sheets-Sheet 1
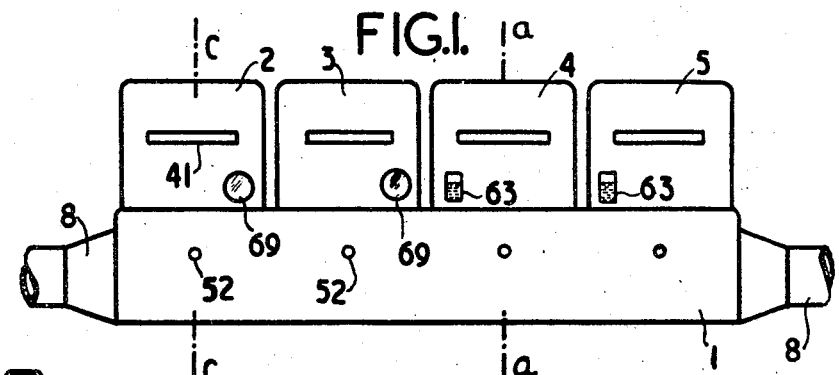
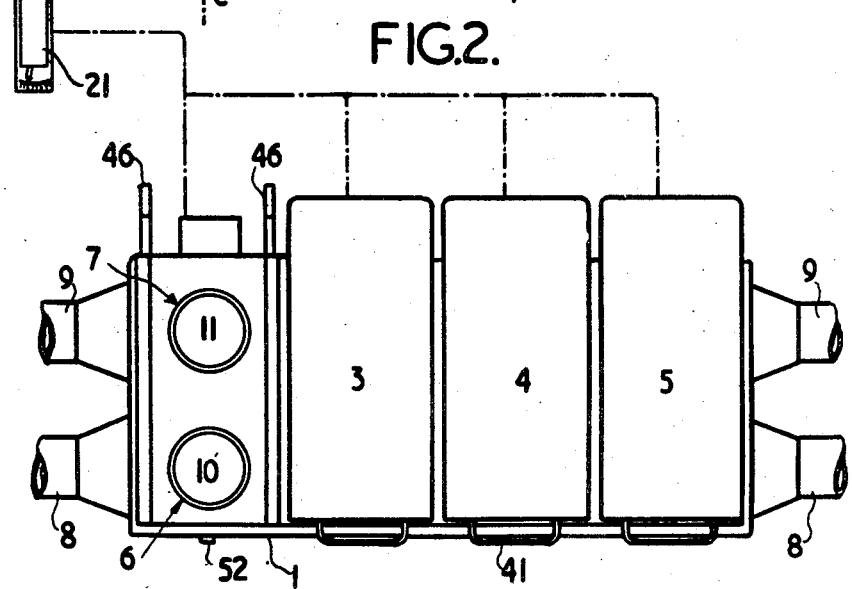
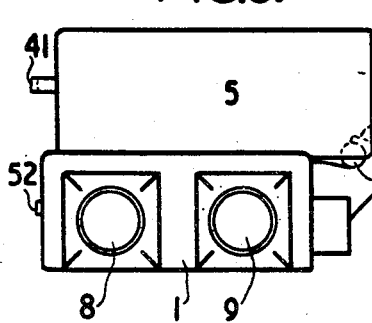
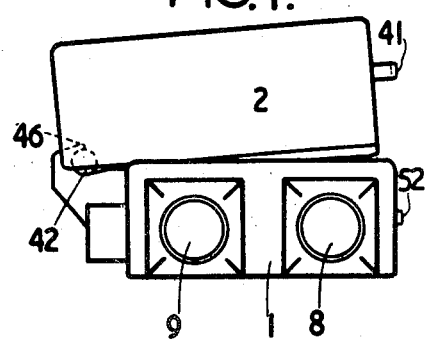
INVENTOR
JOHN HARRIS
BY [signature]
ATTORNEY

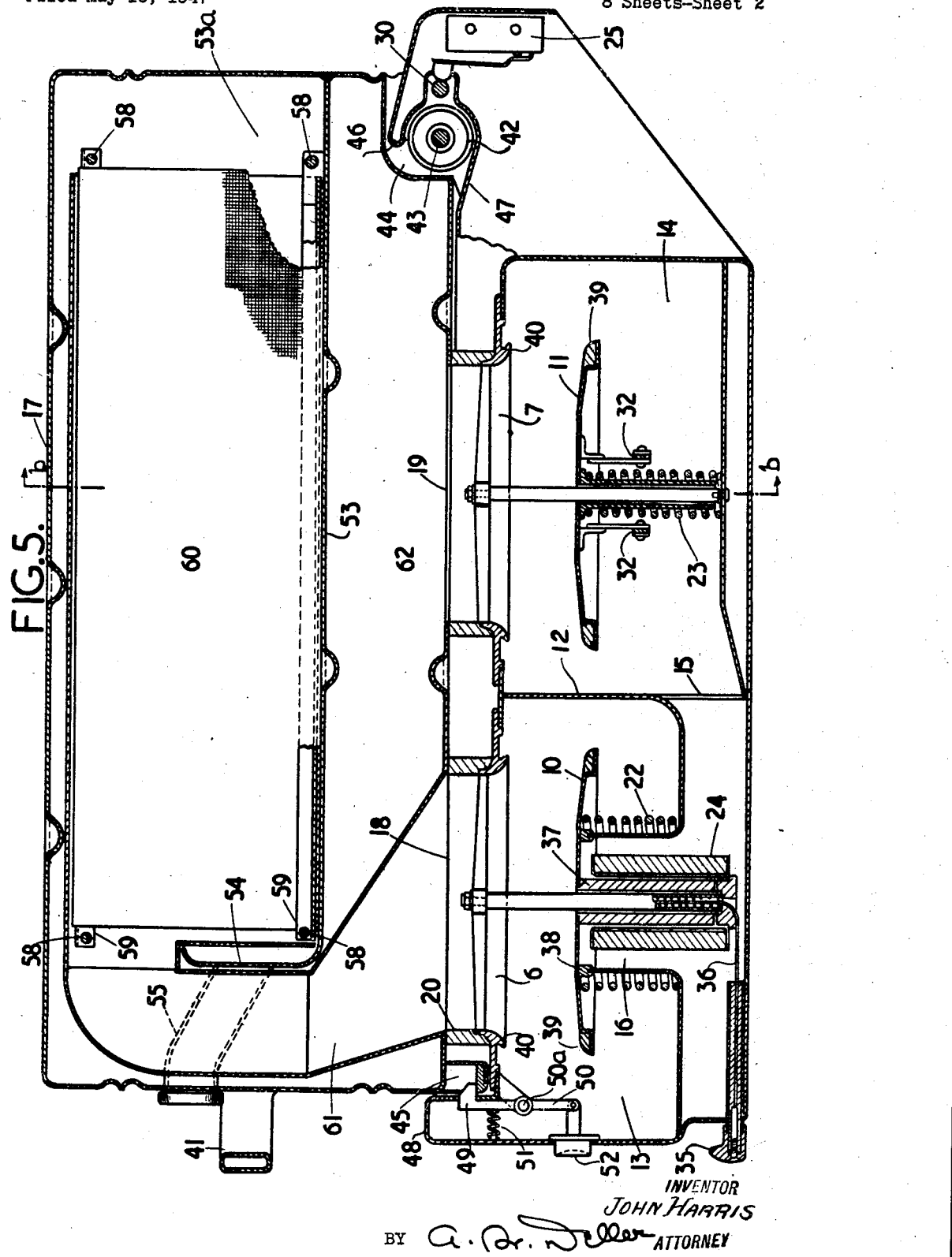

Nov. 1, 1949.  J. HARRIS  2,486,472
AIR CONDITIONING APPARATUS
Filed May 16, 1947  8 Sheets-Sheet 3
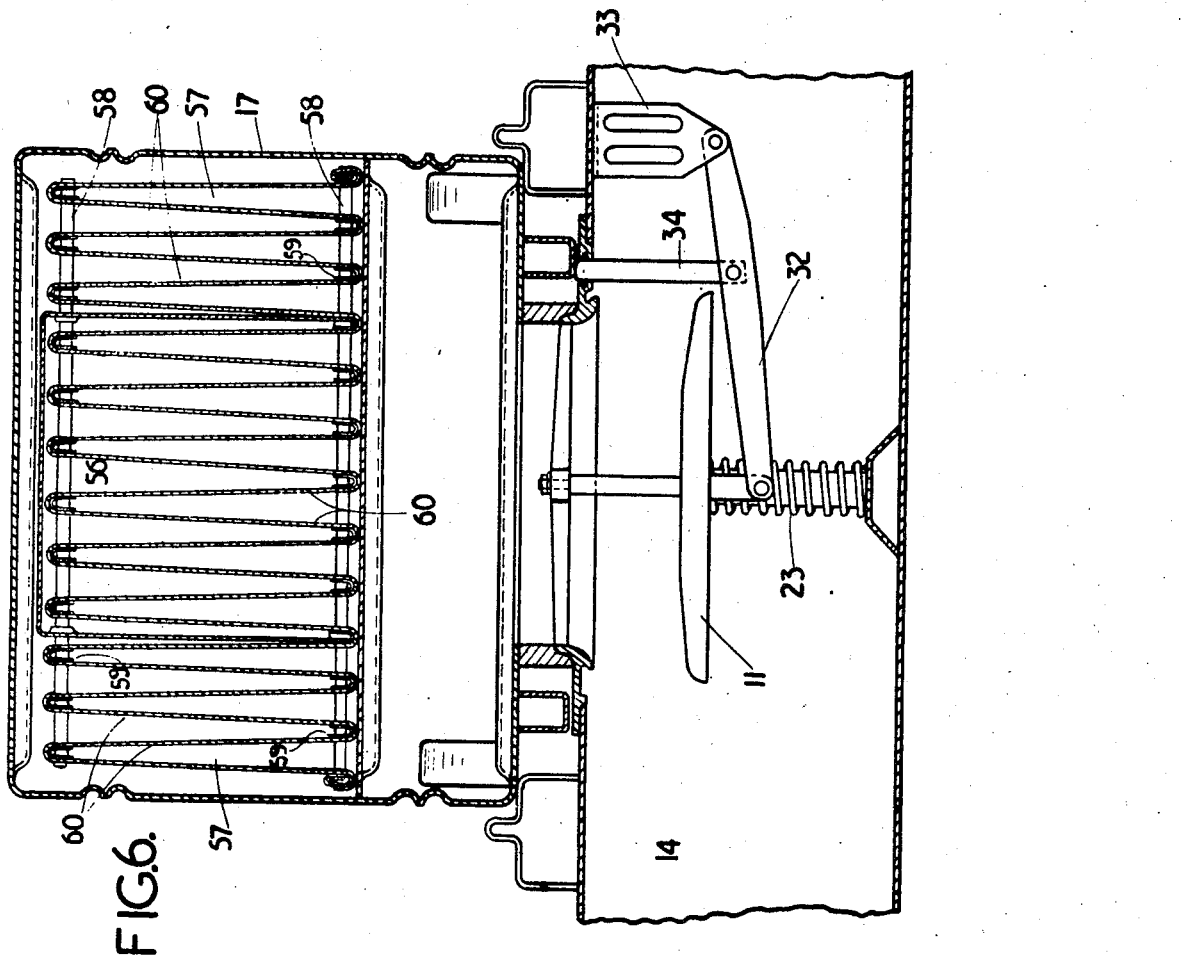
INVENTOR
JOHN HARRIS
BY
ATTORNEY

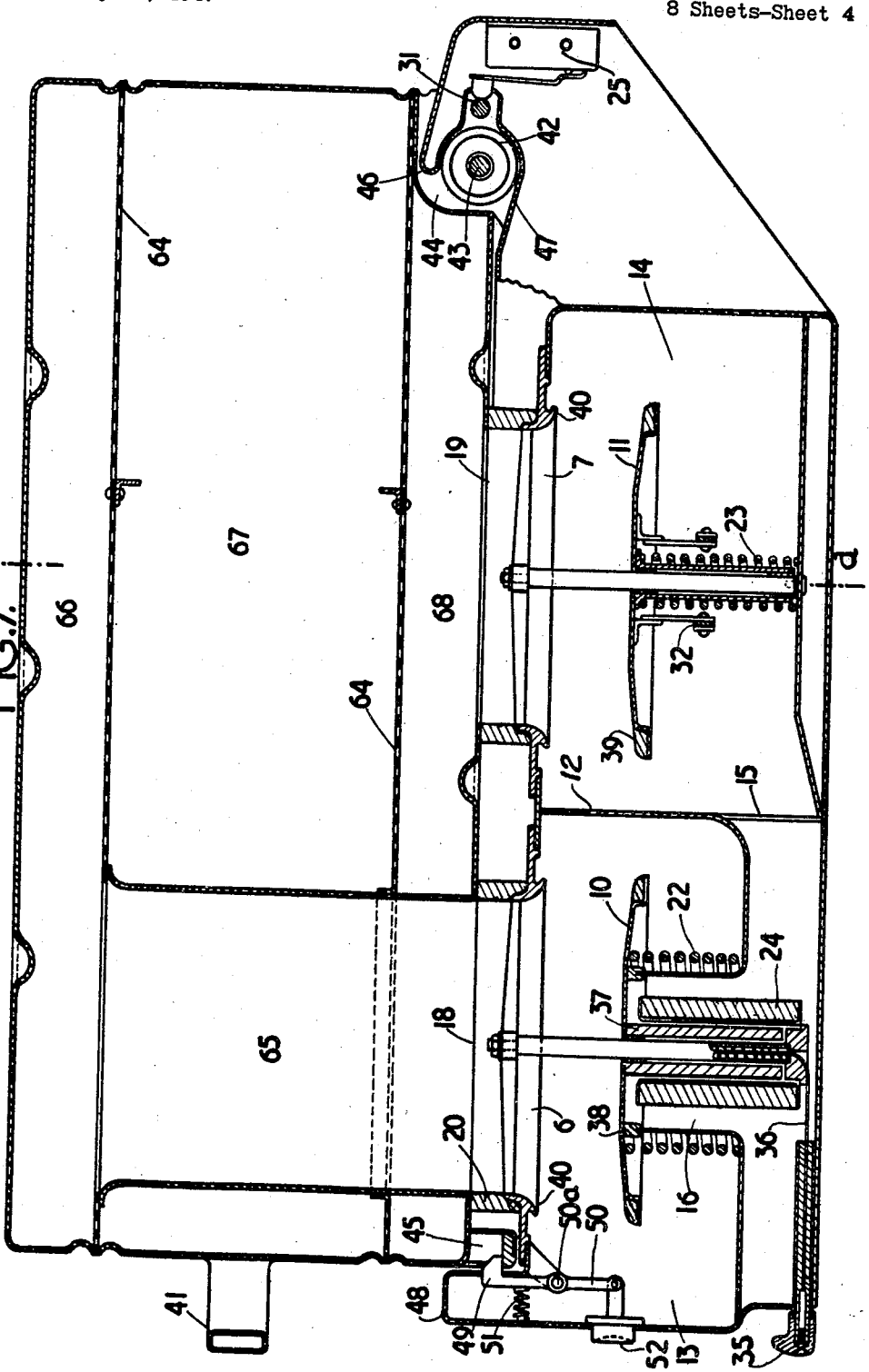

Nov. 1, 1949.                J. HARRIS                  2,486,472
                    AIR CONDITIONING APPARATUS
Filed May 16, 1947                              8 Sheets-Sheet 5
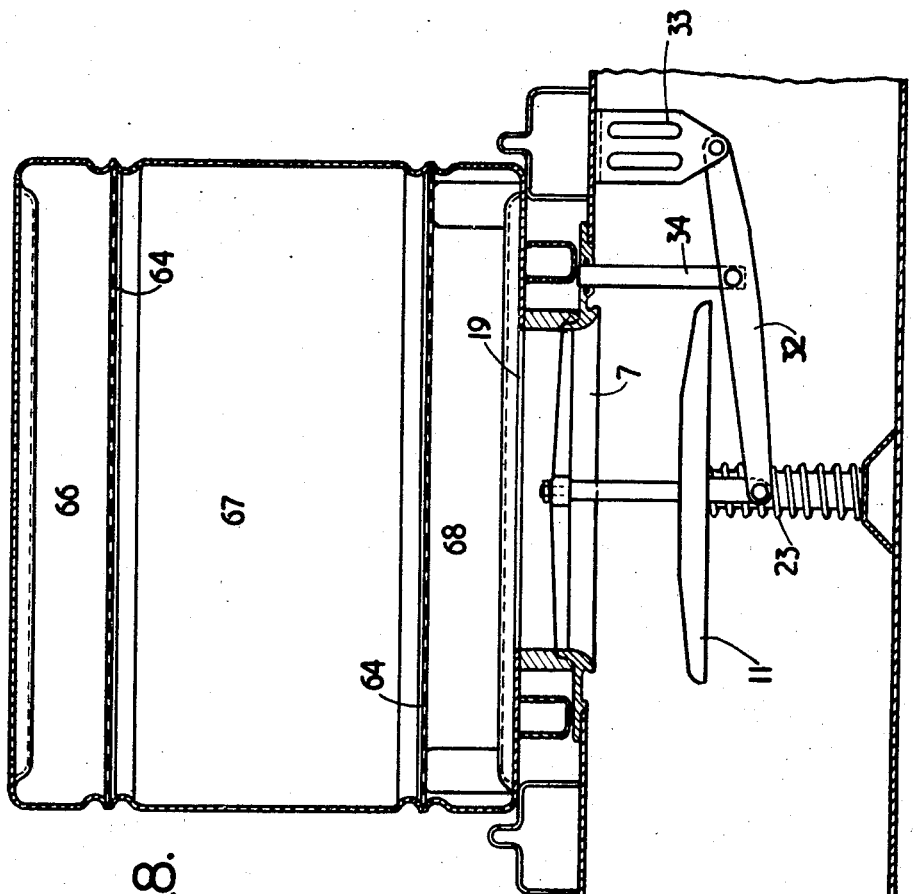
INVENTOR
JOHN HARRIS
BY
  [signature]
         ATTORNEY Nov. 1, 1949.  J. HARRIS  2,486,472
AIR CONDITIONING APPARATUS
Filed May 16, 1947                        8 Sheets-Sheet 6
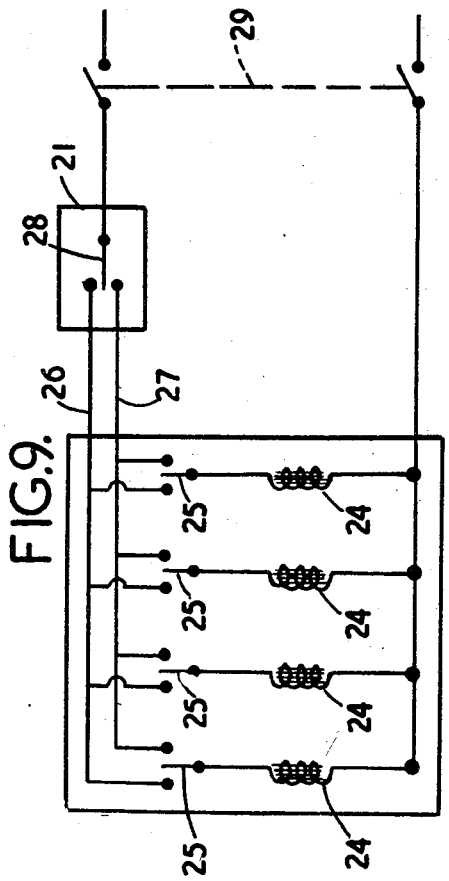
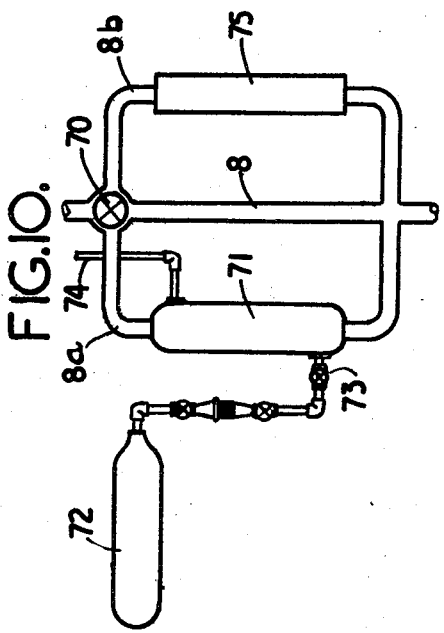
INVENTOR
JOHN HARRIS
BY
ATTORNEY

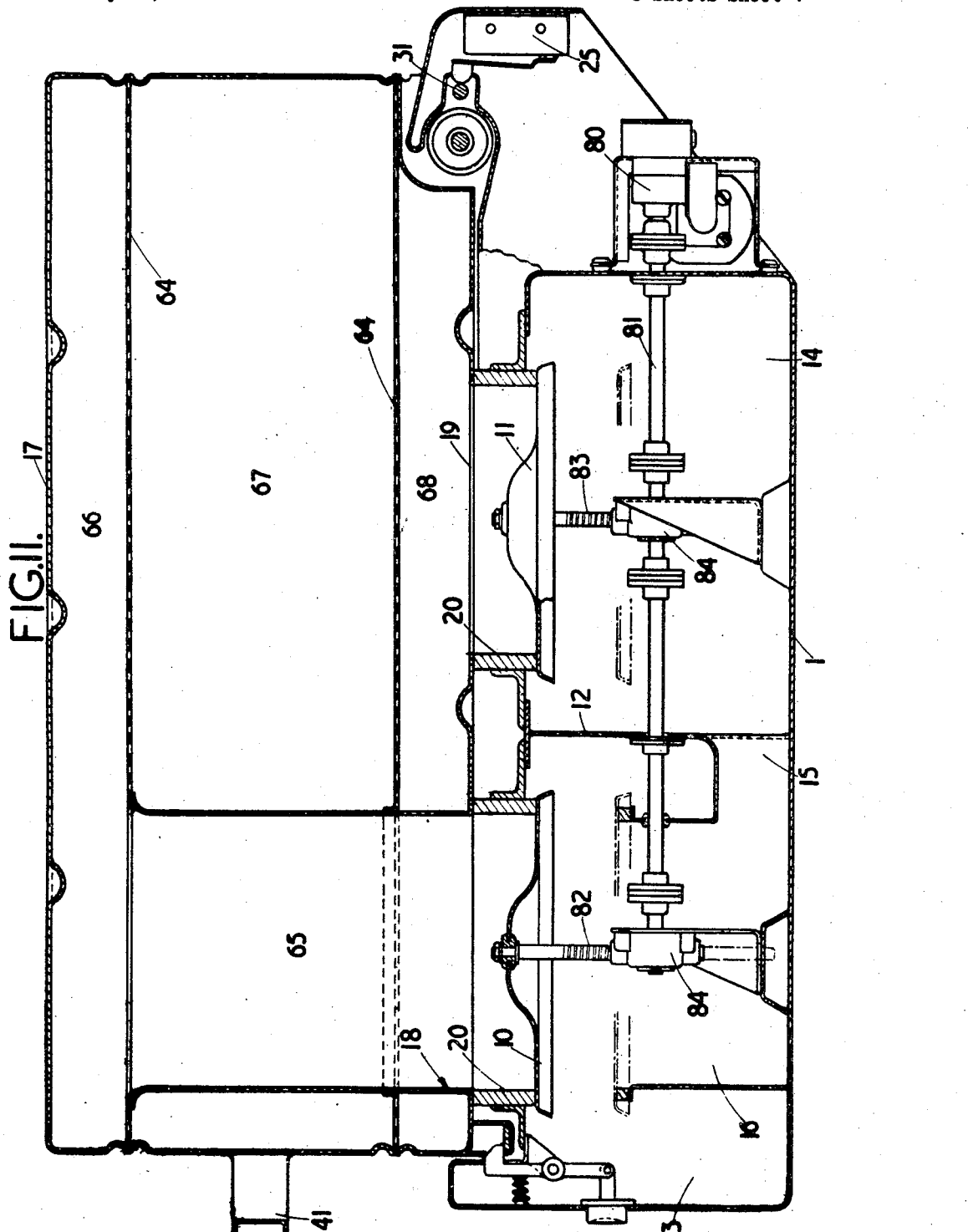

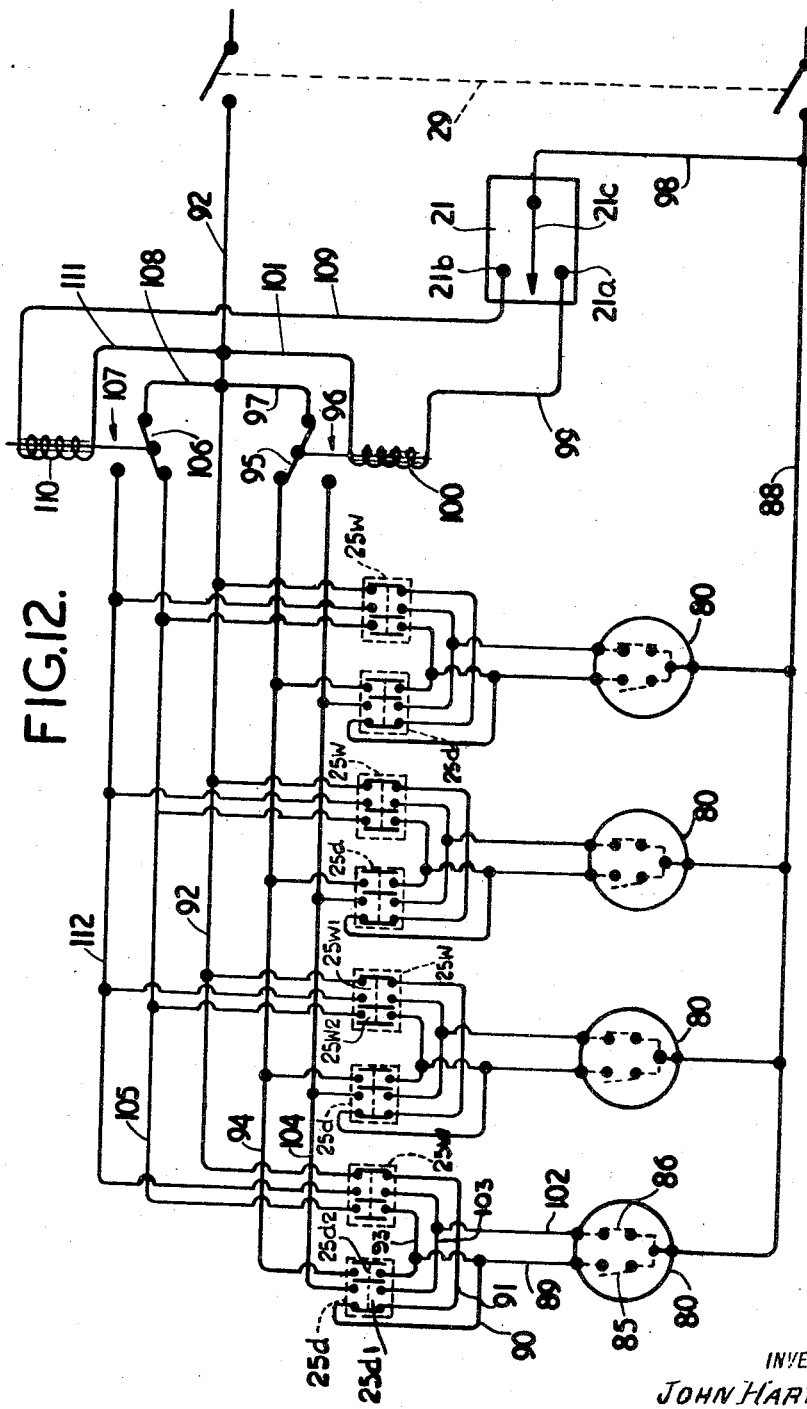

Patented Nov. 1, 1949

2,486,472

UNITED STATES PATENT OFFICE 2,486,472

AIR CONDITIONING APPARATUS

John Harris, Erdington, Birmingham, England, assignor to Birlec Limited, Erdington, Birmingham, England Application May 16, 1947, Serial No. 748,623
In Great Britain May 18, 1946

13 Claims. (Cl. 236—44)

This invention has reference to apparatus whereby the atmosphere in one or more cabins or compartments, such as the cabin or cabins of an aeroplane, can be conditioned or controlled as regards humidity and, if desired, temperature.

One object of the present invention is to provide air conditioning apparatus which is adapted automatically to increase or decrease the humidity of the atmosphere, as required, to maintain a substantially uniform and predetermined degree of humidity in the atmosphere in one or more cabins or compartments irrespective of the degree of humidity of the atmosphere outside the said cabins or compartments.

A further object of the invention is to provide air conditioning apparatus with conditioning units which are readily removable and interchangeable.

Still another object of the invention is to provide air conditioning apparatus which is light in weight and compact in construction so that it is particularly suitable for use in aircraft.

Yet another object of the invention is to provide air conditioning apparatus which is readily adaptable for controlling the temperature, in addition to the humidity, of the atmosphere in one or more cabins or compartments.

These and other objects of the invention will be readily apparent from the specific embodiments of the invention illustrated in the accompanying drawings, in which:

Figure 1 is a front elevation of an air conditioning apparatus in accordance with the invention, embodying four removable and interchangeable units for controlling the humidity of air passed through the apparatus.

Figure 2 is a plan of the apparatus shown in Figure 1, one of the said removable and interchangeable units having been removed from the base of the apparatus.

Figure 3 is an end elevation of the apparatus shown in Figure 1.

Figure 4 is a similar view to Figure 3 but shows the end unit tilted relatively to the base preparatory to removal.

Figure 5 is a sectional elevation, on an enlarged scale, along the line a—a, Figure 1, showing a humidifying or "wetting" unit mounted on the base of the apparatus.

Figure 6 is a sectional elevation along the line b—b, Figure 5.

Figure 7 is a sectional elevation, also on an enlarged scale, along the line c—c, Figure 1, showing a dehumidifying or "drying" unit mounted on the base of the apparatus.

Figure 8 is a sectional elevation along the line d—d, Figure 7.

Figure 9 is a diagram showing the electrical control circuit of the apparatus shown in Figures 5–8.

Figure 10 is a diagrammatic plan illustrating how each air supply conduit to the apparatus may be modified for controlling the temperature of the atmosphere within one or more cabins or compartments.

Figure 11 is a sectional elevation, similar to Figure 7, showing an alternative or modified valve actuating mechanism to that shown in Figures 5–8.

Figure 12 is a diagram showing the electrical control circuit of an apparatus embodying the valve actuating mechanism shown in Figure 11.

The apparatus shown in all the said drawings, comprises a hollow base 1 upon the upper face of which four air conditioning units 2, 3, 4 and 5 are supported. The said supporting surface is formed, for each of the said units, with a pair of ports, namely a port 6 through which air is supplied from the base to the interior of the unit, and a port 7 through which the treated air passes back from the unit to the base, the air being fed from a blower or equivalent device (not shown) to the base through the conduits 8 and discharged for distribution to one or more cabins or compartments, through the conduits 9. The flow of air through each inlet port 6 is controlled by an inlet valve 10 whereas the flow through each outlet port 7 is controlled by an outlet valve 11, the inlet valve 10 being actuated under the control of a humidostat 21 (see Figure 2) located in a cabin or compartment, or each of the cabins or compartments, to which the air is delivered through the conduits 9.

Internally, the base 1 is provided with a partition 12, which divides the interior of the said base into an air inlet chamber 13 from which all the inlet ports 6 open, and an air outlet chamber 14 into which all the outlet ports 7 open; the said partition is provided with an opening 15 below each pair of ports 6 and 7, each opening being of such a cross-sectional area that, when either of the complementary inlet and outlet ports are closed by its valve and air is being by-passed through the opening from the inlet compartment 13 to the discharge compartment 14, substantially the same resistance is offered to the air flow as when both the said inlet and outlet ports are open. Air is adapted to flow to each by-pass opening 15 from the inlet compartment 13, along a duct 16 the mouth or air inlet end of which is located vertically below, and opens towards, the complementary inlet port 6 so that it is adapted to be closed by the valve 10 when the said valve is moved to its fully open position.

Each air conditioning unit comprises an external casing 17 the underside of which is adapted to seat upon the supporting surface of the base 1; the said underside of the casing is formed with an uncontrolled air-inlet port 18 which, when the casing is in position on the base, registers with a complementary valve-controlled inlet port 6 in the said supporting surface, and with an uncontrolled outlet port 19 which registers with a complementary valve-controlled outlet port 7. Resilient sleeves or liners 20 are so provided in the ports 6 and 7 that (as shown in Figure 11) the casings 17 may seat upon the upper ends and the valves 10 and 11 may seat upon the lower ends of the said sleeves, in an air-tight manner; alternatively, as shown in Figures 5–8) the sleeves 20 may provide seatings for the underside of the casings 17, and a metal rim 40 may depend from the ports for receiving and making air-tight joints with resilient washers 39 provided around the periphery of the valves 10 and 11.

Any of the four air conditioning units may contain means (such as a moisture absorbing substance) for decreasing the humidity of air passed therethrough, or means (such as water soaked wicks or sheets) for increasing the humidity of the said air; the units containing the means for decreasing the humidity are hereinafter referred to as "drying units" and the units containing the means for increasing the humidity are hereinafter referred to as "wetting units." Of the four units 2, 3, 4 and 5, the units 2 and 3 are shown as drying units and the units 4 and 5 shown as wetting units; however, if desired, all the said units may be of the wetting or drying type or one only of one type may be provided, the remaining three units being of the other type. To render the two types readily interchangeable, the casings 17 of both are of the same external dimensions and substantially the same external construction.

In the particular application of the invention shown in Figures 5–9, the inlet and outlet valves 10 and 11 are loaded by springs 22 and 23 respectively, the said springs tending to drive and retain the said valves to and in their port closing positions wherein they cut off the flow of air to and through the conditioning units 2, 3, 4 and 5.

The actuation of each inlet valve 10 against its spring 22 is effected by a solenoid, the coil 24 of which is adapted to be connected by a container-operated switch 25 to the one or the other of two parallel electric supply lines 26, 27 (see Figure 9). The humidostat 21 embodies a switch 28 which is adapted automatically to connect a source of current supply to the line 26 when the atmosphere in the cabin or compartment wherein the humidostat is located, reaches a predetermined maximum degree of humidity, or to connect the line 27 to the said source of current supply when the cabin atmosphere reaches a predetermined minimum degree of humidity. When a drying unit is placed in position upon the supporting surface of the base 1, it actuates a switch 25 so as to connect the complementary solenoid coil 24 to the line 26, whereas when a wetting unit is placed upon the base, a switch 25 is actuated to connect the coil to the line 27; hence the coils 24 can be energised, to pull open the valves 10 and allow air to pass from the inlet chamber 13, to and through wetting units, only when the degree of humidity of the atmosphere in the humidostat-containing cabin or compartment becomes deficient, and to allow air to pass to and through drying units only when the degree of humidity of the said atmosphere becomes excessive. The humidity controlling circuit shown in Figure 9 includes a hand-operated double-pole switch 29 which, when opened, is adapted to render the apparatus inoperative. Although, in the wiring diagram shown in Figure 9, the switches 25 are indicated as two-way switches, in the application of the invention shown in Figures 5–8 (and also in the application of the invention shown in Figure 11) two one-way switches 25 are provided for each pair of inlet and outlet ports 6 and 7; the switches 25 associated with each of the said pairs of ports are so located upon the base 1, that one of the said switches is disposed in the path of, and is adapted to be closed by, a pin 30 provided at or adjacent one side of a wetting unit, whereas the other of the said switches is disposed in the path of, and is adapted to be closed by, a similar pin 31 located at or adjacent the opposite side of a drying unit. Thus, it will be appreciated that when, with such a system for controlling the solenoid-actuated inlet valves 10, a degree of humidity intermediate the predetermined maximum and minimum degrees, exists in the humidostat-containing cabin or compartment, the humidostat switch closes neither of the circuits through the parallel lines 26 and 27; therefore the solenoid coils 24 are de-energized and the inlet valves 10 are spring driven automatically to their closed positions; since, under such conditions, no air can flow through any of the air conditioning units 2, 3, 4 and 5, it is all constrained to flow from the inlet chamber 13, to the outlet chamber 14, through the ducts 16 and openings 15 and it is circulated idly through the apparatus.

As shown, more particularly in Figures 6 and 8, each outlet valve 11 is held constantly in its open position, against the action of spring 23, whenever a conditioning unit, whether of the wetting or drying type, is located on the base above the complementary outlet port 7. For this purpose, each valve 11 is coupled to one end of a bifurcated lever 32 located within the outlet chamber 14 of the base 1 and hingedly connected at its other end to a bracket 33 depending from the crown of the said base. A plunger 34 extends upwardly from a position intermediate the ends of the lever, and projects through an opening in the crown of the base above the unit-supporting surface of the said base. Consequently, as a unit 2, 3, 4 or 5 is lowered into position upon the base 1, it abuts the projecting end of the plunger and depresses the said plunger thereby swinging the lever 32 downwardly about its hinge connection to the bracket 33, and retracting the valve 11 against the action of spring 23. The removal of the unit from the base enables the said spring to return the valve, lever and plunger to their initial positions wherein the outlet port 7 is closed by the said valve.

Should it be desired to open any one of the inlet ports 6 at will and independently of the humidostat 21 and of the valve-operating solenoid, the complementary valve may be retracted manually by pulling a handle 35 between which and the said valve, a wire 36 or the like is connected.

The underside of each valve 10 carries the core 37 of the solenoid and, when the valve is in its fully open position, seats upon and makes an airtight joint with a resilient rim 38 fitted around the mouth of the duct 16.

Each unit casing 17 is provided with a handle 41 at its forward end whereby the unit may be readily manipulated. On its ported underside, and at or adjacent each side of its rearward end, the said casing is provided with a roller 42 which projects below the said underside; the said rollers are carried upon axles 43 which bridge pockets 44 in the casing and the switch-actuating pin 30 or 31 also bridges one or other of the said pockets, depending on whether the unit is of the drying or wetting type, rearwardly of the said axles. Centrally of its forward end, the casing is formed or provided with a recess 45.

The base is provided along its rear and upper edge with four pairs of jaws 46 which are so disposed that when engaged by the casing rollers 42 they locate the units 2, 3, 4 and 5 in their correct positions relatively to the complementary inlet and outlet ports 6 and 7. The bottom of each jaw is depressed relatively to the unit-supporting surface of the base 1 and at the mouth of the jaw the said surface is formed with a downwardly inclined ramp 47 for guiding a roller into the jaw. A shoulder 48 is formed along the forward edge of the base 1 and through the rearward wall of the said shoulder, the noses 49 of four catches 50 project; each of the said catches is loaded by a spring 51 which normally retains the catch in the position wherein the nose projects through the said shoulder wall, a manually-operable pushbutton 52 being connected to the catch to enable the said catch to be turned about its fulcrum 50a to withdraw the nose into the shoulder. The catches are located centrally of each pair of roller-jaws 46.

To assemble a wetting or drying unit upon the ported supporting surface of the base 1, the rollers 42 are placed upon the forward part of the said surface; the unit is then pushed rearwardly with its rollers resting upon the said surface, keeping the underside of the unit out of contact with the supporting surface. As the rollers reach the rearward side of the supporting surface, they register with the complementary ramps 47 down which they then travel into complementary jaws, to locate the unit in its correct position, and, at the same time, lower the said unit relatively to the said surface so that, by lowering the forward end of the unit behind the shoulder 48, the uncontrolled ports 18 and 19 register with the valve-controlled ports 6 and 7 respectively and the nose 49 of the spring-loaded catch 50 enters the recess 45, to lock the unit to the base 1.

Internally of its casing 17, each wetting unit is provided with a transverse partition or floor 53 which is spaced from the ported underside of the said casing and extends between the side walls and also across the rear wall of the said casing, the edges of the said partition or wall being welded or otherwise permanently anchored to the said walls in a water-tight manner. The forward edge of the partition 53 is spaced from the forward wall of the casing and is formed with an upwardly extending and anti-splash weir 54. Thus, a well 53a is formed within the casing in spaced relationship to its forward wall and its ported underside. A filling spout 55 enables water to be fed to the said well.

Between the partition 53 and the top of the casing, there is provided an air duct 56 of inverted U-shape in cross section, the said duct being appreciably less in width than, and being located centrally of, the casing so as to provide, between its side walls and the side walls of the casing, two additional air ducts 57. The duct 56 extends from the weir 54 to a position removed from the rearward wall of the casing so that air may flow around the rearward end of the said duct into the lateral ducts 57. A rod 58 extends transversely of the casing at the top and bottom and at each end of the ducts 56 and 57, the said rods carrying along their length a series of channel-section supports 59 for a water absorbent sheet 60 arranged in a sinuous or zig-zag manner as shown in Figures 5 and 6, with the bottom portions of each span dipping into the water in the well 53a.

An air duct 61, of the same width as the duct 56, extends upwardly from the inlet port 18 in the underside of the casing 17, between the forward end of the said duct and the forward wall of the said casing. The duct 61 opens into and makes an air-tight connection with the duct 56, above the weir 54.

Hence, when a wetting unit is in position upon the ported supporting-surface of the base 1 and the complementary inlet valve has been opened, air passes through the registering ports 6 and 18, along the duct 61 and the duct 56 to the rear of the casing. The air then reverses its direction and returns along each lateral duct 57 to the front of the casing, passes downwardly around the outside of the duct 61 into the space 62 between the partition 53 and the underside of the casing, and then out of the casing, through the registering ports 19 and 7, into the outlet chamber 14. As the air flows along the ducts 56 and 57 it passes over the surface of the soaked sheet 60 and its humidity is consequently increased.

A sight-window 63 (see Figure 1) is provided in the front of the casing of each wetting unit to enable the water level in the well 53a to be visually ascertainable.

Internally of its casing 17, each drying unit is provided with two perforated partitions 64 which are spaced both from one another and from the top and bottom of the said casing. An air duct 65 extends from the inlet port 18 to the upper of the two partitions to enable air to pass through the said port and along the said duct into the space 66 between the said upper partition and the top of the casing. The space 67 between the two perforated partitions is packed with water-absorbent substance so that as the air flows downwardly from the space 66 and through the space 67 moisture is absorbed therefrom and its humidity is consequently decreased. The air flows from the space 67 through the lower perforated partition, the space 68 between the said lower partition and the underside of the casing, and the registering ports 19 and 7, into the outlet chamber 14 of the base 1.

A sight window 69 (see Figure 1) is provided in the front of the casing 17 of each drying unit and the absorbent material in the space 67 is preferably of such a nature that it changes colour as its moisture content increases. A suitable absorbent material of the character referred to may consist of activated alumina or silica gel which is impregnated with cobalt salt so that, when dried, it will be blue in color and, when wet, will be pink. The sight window thus provides a ready means of visually ascertaining the condition of the said absorbent material.

From the above description, it will be appreciated that when air is fed from the external atmosphere or from a cabin or compartment, through the air inlets 8, to the inlet chamber 13, then, provided that the said air is at the desired degree of humidity or is within permitted extreme degrees of humidity (or provided that no units 2, 3, 4 and 5 are assembled upon the base 1), all the four inlet valves 10 will be closed and the air cannot obtain access to either of the wetting or drying units. Therefore, the air fed to the said inlet chamber passes through the ducts 16, openings 15, the outlet chamber 14 and the discharge conduits 9, to the one or more cabins or compartments. However, if the humidity of the air in any humidostat-containing cabin or compartment is too high, the humidostat completes the circuit containing the supply line 26 so that the two solenoid coils 24, previously connected to the said supply line owing to the closing of the two complementary switches 25 by the drying units 2 and 3, are energized and pull the complementary inlet valves 10 to their open positions as shown in Figure 7. Therefore, since all the outlet valves 11 are always open when the units 2, 3, 4 and 5 are in position on the base 1, some air is permitted to flow through the said drying units thereby reducing the humidity of the whole of the air fed to the one or more cabins or compartments. On the other hand, if the humidity of the air in any humidostat-containing cabin or compartment fall below a predetermined minimum, the humidostat completes the circuit through the line 27, the switches 25 closed by the two setting units 3 and 4 and the other two coils 24, consequently energizing the other two solenoids and opening the complementary inlet valves 10 so that some air flows through the said wetting units and increases the humidity of the air supplied to the one or more cabins or compartments.

If it is desired to control the temperature as well as the humidity of the atmosphere in the one or more cabins or compartments, the above described apparatus may be readily adapted for this additional purpose, as indicated diagrammatically in Figure 10, by including in one or each air supply conduit 8, a three-position valve 70 which is adapted to be operated by a thermostat or like thermally sensitive device (not shown) located in one or each of the cabins or compartments, for guiding the air either through the conduit 8 (when desired temperature conditions exist), a branch conduit 8a (when the temperature becomes excessive) or a branch conduit 8b (when the temperature falls too low).

A limb of the branch conduit 8a is shrouded by a jacket 71 to which ammonia is fed from a bottle 72, containing liquid ammonia at a high pressure, through an expansion valve 73. The vaporisation of the liquid ammonia at the said valve and in the said jacket absorbs heat from the conduit 8a and therefore cools the air flowing through the said conduit. The ammonia vapour is withdrawn from the jacket through a pipe 74 so that it may be treated and used in any desired manner and for any desired purpose.

Similarly, a limb of the branch conduit 8b is enlarged at 75 and electric resistance heating elements or any alternative heating means are installed in the said enlargement for raising the temperature of air directed through the said branch conduit. When electric resistance heating elements are installed in the enlargement 75, the thermostat or like thermally sensitive device may be utilised not only for operating the valve 70 but also for connecting the said elements to a source of electric current when the cabin atmosphere cools.

The solenoid actuated inlet valves 10 and the unit actuated outlet valves 11 can, in the apparatus described with reference to Figures 5–8, only assume their extreme fully closed or fully open positions; consequently, it is not possible to control the volume of air fed through either type of conditioning unit; either the flow is cut off altogether or, alternatively, it is at a maximum. Also, since the outlet valves remain fully open during the whole time the units 2, 3, 4 and 5 are positioned upon the base 1, it is possible that some air may have access to the interior of the said units through the registering ports 7 and 19, even though the inlet valves 10 are closed.

The modified or alternative application of the invention shown in Figures 11 and 12 overcomes these disadvantages as it incorporates valve-actuating means which enable the said valves, in addition to assuming their extreme positions, to float between, or take up positions intermediate, the said extreme positions.

With this end in view, the valve-actuating mechanism associated with each pair of inlet and outlet valves 10 and 11, comprises a reversible electric motor 80 which is mounted on and externally of the rearward wall of the base 1. The same motor drives a shaft 81 which extends forwardly into the said base, and is operatively coupled to the rods 82 and 83 of the said valves 10 and 11 respectively, through worm or like drive transmission gearing 84.

As stated above two switches 25 are provided for each pair of valve-controlled inlet and outlet ports and, in Figure 12, the two switches associated with each of the four pairs of ports of the arrangement shown in Figure 11, are indicated by the references 25d and 25w.

Each of the said switches 25d, 25w is of the dual purpose type and comprises a change-over switch 25d¹, 25w¹ and a make-and-break switch 25d², 25w² respectively.

Each reversible motor 80 includes two limit switches 85 and 86; the limit switch 85 is connected in the circuit of the winding (hereinafter termed the "closing" winding) when the said circuit is closed, causes the motor to drive the valves 10 and 11 to their closed positions, the limit switch 86 being connected in the circuit of the other motor winding (hereinafter termed the "opening" winding) and is adapted to cause the motor to drive the valves to their open positions.

When no air conditioning unit is in position on the base above the complementary pair of ports 6 and 7, and the control switch 29 is closed, the limit switch 85 and the closing winding of the motor are connected through the line 88, the line 89, the line 90; the closed contacts of the change-over switch 25d¹, the line 91, the closed contacts of the change-over switch 25w¹, and the line 92, to the source of electric current supply; therefore, should the valves tend to open for any reason, or should they be open as the unit is removed from the base 1, the motor is started up automatically in the direction which drives the said valves 10 and 11 to their closed positions.

If a drying unit is placed in position upon the base 1 of the apparatus, the pin 31 thereof operates the complementary switch 25d to change over the switch 25d¹ from the position shown in Figure 12, and to close the switch 25d². Similarly, if a wetting unit is placed in position upon the base 1, its pin 30 actuates the complementary switch 25w to change over the switch 25w¹ from the position shown in Figure 12 and to close the switch 25$w^2$.

The changing over of a switch 25$d^1$ by a drying unit, opens its previously closed contacts and closes its previously open contacts and the limit switch 85 and closing winding are connected through the line 88, the line 89, the line 93, the switch 25$d^2$, the line 94, the contact 95 of a relay 96, the line 97 and the line 92 to the source of current supply so that the valves 10 and 11 are again held automatically in their closed positions.

However, if the humidity of the atmosphere in a humidostat-containing cabin or compartment, becomes excessive, the arm 21c of the humidostat swings into contact with its terminal 21a and completes an electric circuit from the source of current supply through the line 98, the arm 21c, the terminal 21a, the line 99, the coil 100 of the relay 96, the line 101 and the line 92, to energize the said coil and actuate the said relay 96. Consequently, the circuit through the closing winding is broken and a circuit is completed through the line 88, the limit switch 86, the opening winding of the motor, the line 102, the line 103, the closed contacts of the change-over switch 25$d^1$, the line 104, the relay contact 95, the line 97 and the line 92, so that the motor is driven in the direction which moves the valves 10 and 11 towards their open positions. When the atmosphere in the cabin or compartment reaches the desired degree of humidity, or a degree of humidity within the permitted limits, the arm 21c swings away from the terminal 21a thereby breaking the circuit of the relay coil 100 and allowing the relay contact 95 to return to its initial position wherein it again completes the circuit through the limit switch 85 and the closing winding of the motor 80; hence the valves are returned to their closed positions. Should the above degree of humidity be attained before the valves reach their fully open positions, the above reversal of movement will be brought about in the same manner, that is, the valves will float between their two extreme positions.

When the valves are driven to either of the extreme positions, the corresponding limit switch 85 or 86, as the case may be, is opened automatically thereby bringing the motor 80 to rest.

On the other hand, if a wetting unit is placed in position on the base 1 above a pair of valves 10 and 11, the changing over of the complementary switch 25$w^1$ and the closing of the complementary switch 25$w^2$, completes a circuit through the line 88, the limit switch 85, the closing winding of the motor 80, the line 89, the line 93, the said switch 25$w^2$, the line 105, the contact 106 of a relay 107, the line 108 and the line 92, so that the valves 10 and 11 remain closed.

However, if the degree of humidity of the atmosphere in a humidostat-containing cabin or compartment becomes deficient, the arm 21c of the humidostat is swung into electrical connection with the terminal 21b and a circuit is completed through the line 88, the line 98, the said arm 21c, the said terminal 21b, the line 109, the coil 110 of the said relay 107, the line 111 and the line 92. Consequently, the said coil is energized and the relay 107 is actuated to change over its contact 106 and complete a circuit through the line 88, the limit switch 86, the opening winding of the motor 80, the line 102, the line 103, the now closed contacts of the change-over switch 25$w^1$, the line 112, the said relay contact 106, the line 108 and the line 92. Therefore, the motor is started up in the direction which opens the valves 10 and 11, and continues to drive the said valves towards their fully open positions until either the said positions are attained and the said limit switch is automatically opened to bring the said motor to rest, or a permitted degree of humidity of the cabin or compartment atmosphere is attained. No matter when the latter circumstances are attained, the humidostat arm 21c swings out of electrical connection with the terminal 21b, to open the circuit of and de-energize the relay coil 110, and to permit the return of the relay contact 106 to its initial position, thereby re-closing the circuit through the closing winding of the motor 80 and returning the valves towards their closed positions.

All the four pairs of switches 25d and 25w shown in Figure 12 are arranged and adapted to be operated in the manner described above so that when, as shown in Figures 1–4, two drying units and two wetting units are assembled upon the base 1, the switches 25d of two of the said pairs are operative for controlling their complementary motors 80 and the switches 25w of the other two of the said pairs are operative for the same purpose.

The apparatus described above, in either of its alternative forms, is particularly suitable for controlling atmospheric conditions in the cabins of aeroplanes wherein the said conditions are likely to vary considerably and rapidly during a single flight. For instance, the air conditioning units 2, 3, 4 and 5 are readily removable before the flight commences if it is known that the apparatus will not be required during the flight, thereby reducing dead load to a minimum; also the said units are readily interchangeable, so that any combination of drying and wetting units may be assembled to the base 1 and both types of unit are capable of being regenerated quickly and easily at any desired base before or after a flight.

I have illustrated and described two embodiments of my invention, but it is to be understood that the invention may be embodied or practiced within the scope of the following claims; for example, the base 1 may be designed to carry a greater or smaller number of air conditioning units; a ported partition may be provided in the outlet chamber 14 the ports in which are so arranged that they are adapted to be closed by the complementary valves 11 when the latter are in their fully open positions; also, in the arrangement shown in Figures 5–8, the said valves 11 may be solenoid operated in the same way as the valves 10; and the arrangement shown in Figures 11 and 12 may be modified so that the valves 10 and 11 may be brought to rest intermediate their extreme positions when the degree of humidity of the atmosphere in the one or more cabins or compartments is not greatly deficient or excessive. Further, although the above description refers only to apparatus for controlling the humidity of air, it is to be understood that, by changing the contents of the conditioning units 2, 3, 4 and 5, and by using a suitable sensitive device instead of the humidostat 21, the apparatus may be employed for controlling predetermined specific conditions in other gases or fluids.

Having described my invention, what I claim and desire to secure by Letters Patent is:

1. Apparatus for conditioning a fluid, comprising a base, a partition in the base dividing the interior of the said base into a fluid inlet chamber and a fluid outlet chamber, the base having a plurality of inlet ports opening from the said inlet chamber and an equal number of outlet ports opening from the said outlet chamber, the said ports being arranged in pairs each pair consisting of an inlet port and an outlet port, and the said partition having a plurality of ports equal to the number of the said pairs of ports, a valve associated with each of the said pairs of ports for closing the complementary inlet port in one extreme position and for closing the complementary partition port in its other extreme position. A plurality of interchangeable and ported fluid conditioning units detachably assembled on the base with the ports of each unit in register with a complementary pair of ports in the base, means, other than the said ports, for feeding fluid to and from the said base, and means located in the fluid to be conditioned, for automatically actuating the said valves from one extreme position to the other to close the complementary partition ports and open the complementary inlet ports when predetermined undesirable conditions exist in the fluid and for automatically returning the said valves to their initial extreme positions to close the complementary base ports and open the complementary partition ports when the said undesirable conditions are eliminated.

2. Apparatus for conditioning a fluid, comprising a base, a partition in the base dividing the interior of the said base into a fluid inlet chamber and a fluid outlet chamber, means for feeding fluid to the said inlet chamber and from the said outlet chamber, the base having a plurality of inlet ports opening into the inlet chamber, and an equal number of outlet ports opening into the outlet chamber, and the partition having the same number of ports therein, a plurality of ported and interchangeable fluid conditioning units detachably assembled to the base with the ports in each unit in register and making a fluidtight connection with a complementary inlet port and a complementary outlet port in the base so that fluid can flow from the said inlet chamber to the said outlet chamber either through one or more conditioning units or one or more partition ports, a valve for closing each inlet port in one of its extreme positions and a complementary partition port in the other of its extreme positions, and means located in the fluid to be conditioned for automatically actuating some of the said valves to their extreme partition-port closing positions when a predetermined fluid condition is exceeded, for actuating the remainder of the said valves to their partition-port closing positions when the said fluid condition is decreased, and for automatically returning the said valves to their initial inlet-port closing positions as and when the said fluid condition is restored.

3. Apparatus for conditioning a fluid, comprising a base, having pairs of ports therein each pair of ports comprising a fluid inlet port and a fluid outlet port, a ported partition in the base dividing the interior of the base into an inlet chamber into which all the said inlet ports open and an outlet chamber into which all the said outlet ports open, means, other than the said ports, for supplying fluid to the said inlet chamber and for discharging fluid from the said outlet chamber, ported and interchangeable fluid conditioning units detachably assembled to the said base, each unit being so ported and arranged that its ports register and make a fluidtight connection with a pair of base ports, some of the said units being charged with substances for enhancing a predetermined condition of fluid passed therethrough and the remainder being charged with a substance minimising the said condition, valves for closing each of the said inlet ports in one of their extreme positions and each of the said partition ports in their other extreme positions, and means located in the fluid to be conditioned for automatically and simultaneously displacing the valves controlling the inlet ports to the condition enhancing units from their inlet-port closing positions when the predetermined condition of the fluid becomes deficient, for automatically and simultaneously displacing the remainder of the valves from their inlet-port closing position when the predetermined fluid condition becomes excessive, and for returning all the said valves to their said port-closing positions as and when the said fluid condition is restored.

4. Apparatus for conditioning a fluid, comprising a base, having pairs of ports therein each pair of ports comprising a fluid inlet port and a fluid outlet port, a ported partition in the base dividing the interior of the base into an inlet chamber into which all the said inlet ports open and an outlet chamber into which all the said outlet ports open, means, other than the said ports, for supplying fluid to the said inlet chamber and for discharging fluid from the said outlet chamber, ported and interchangeable fluid conditioning units detachably assembled to the said base, each unit being so ported and arranged that its ports register and make a fluidtight connection with a pair of base ports, some of the said units being charged with substances for enhancing a predetermined condition of fluid passed therethrough and the remainder being charged with a substance minimising the said condition, valves for closing each of the said inlet ports in one of their extreme positions and each of the said partition ports in their other extreme positions, and means located in the fluid to be conditioned for automatically and simultaneously displacing the valves controlling the inlet ports to the condition enhancing units from their inlet-port closing positions when the predetermined condition of the fluid becomes deficient, for automatically and simultaneously displacing the remainder of the valves from their inlet-port closing position when the predetermined fluid condition becomes excessive, for returning all the said valves to the said port-closing positions as and when the said fluid condition is restored and for returning any individual valve to its said initial position when the complementary fluid conditioning unit is removed from the base.

5. Apparatus for conditioning a fluid, comprising a ported base, a plurality of ported and interchangeable fluid conditioning units so detachably assembled to the said base that the ports in each of the said units register respectively with a complementary fluid inlet port and a complementary fluid outlet port in the said base, some of the said units being charged with a substance for enhancing a predetermined fluid condition when fluid is directed therethrough and the remainder of the said units being charged with a substance for minimising the said fluid condition, each condition-enhancing unit being provided with means for closing one of two complementary electric switching devices and each condition-minimising unit being provided with means for closing the other of said complementary switching devices as the said units are assembled to the base, and condition-controlled means located in the fluid to be conditioned, for closing the circuit of the switching devices closed by the assembled condition-enhancing units when the said fluid condition becomes deficient and for closing the circuit of the remainder of the switching devices when the said fluid condition becomes excessive, and valves for opening and closing the inlet ports in the said base, the said valves which control the flow of fluid from the base through the condition-enhancing units being displaced from their inlet-port closing positions when the circuits of the complemetnary switching devices are closed by the said condition-controlled means, and the valves which control the flow of fluid from the base through the condition-minimising units being displaced from their inlet-port closing positions when the circuits of the remainder of the said switching devices are closed by the said condition-controlled device.

6. Apparatus for controlling the humidity of the air in one or more compartments, comprising a base, means for supplying air through the base to the said compartment or compartments, the said base having a plurality of pairs of ports each pair consisting of an inlet port and an outlet port, a plurality of interchangeable conditioning units detachably assembled to the said base, each having two ports which register respectively with a pair of ports in the base, valves for controlling the flow of air from the base through the said registering ports and conditioning units from and back to the base, and a humidostat located in one or more of the said compartments for displacing the said valves from their port closing positions when the degree of humidity of the air in the said compartment or compartments is at an undesirable value.

7. Apparatus for controlling the humidity of the air in one or more compartments, comprising a ported base, means for supplying air to the compartment or compartments through the said base, a plurality of interchangeable units detachably assembled to the said base with their ports in register with complementary ports in the base, some of the said units being charged with air drying means and the remainder being charged with air wetting means, valves for controlling the flow of air through the registering ports and the said units from and to the said base, and a humidostat located in one or more of the compartments, for displacing the valves controlling the flow of air through the said drying units from their port closing positions when the degree of humidity of the air in any compartment becomes excessive, for displacing the valves controlling the flow of air through the wetting units when the humidity of the air in the compartment or compartments becomes deficient, or for returning the said valves to their port-closing positions when the said air attains a desired degree of humidity.

8. Apparatus for controlling the humidity of the air in one or more compartments, comprising a base having a plurality of pairs of ports in its crown, a plurality of interchangeable units for varying the humidity of air, detachably assembled on the said crown, each unit having a pair of ports in its underside which register and make an airtight joint with a complementary pair of ports in the base, a ported partition within the base dividing the base interior into an air inlet chamber into which one of each pair of base ports opens and an outlet chamber into which the other of each pair of base ports opens, valves for closing the ports in the inlet chamber in one of their extreme positions and for closing the partition ports in the other of their extreme positions, a humidostat in one or more of the said compartments for displacing the valves from one extreme position to the other according to the degree of the humidity of the air in the said compartment or compartments, and means for supplying air through the said base to the said compartment or compartments.

9. Apparatus for controlling the humidity of the air in one or more compartments, comprising a base, a plurality of interchangeable units for varying the humidity of air passed therethrough, detachably mounted on the base, each unit having a pair of uncontrolled ports one of which registers and makes an airtight connection with an inlet port in the said base and the other of which registers and makes an airtight joint with an outlet port in the said base, a solenoid controlled valve associated with each inlet port, a humidostat located in one or more of the said cabins for closing the coil circuits of the said solenoids and displacing the valves from their port closing positions when the degree of humidity of the air in any of the said compartments reaches an undesirable value, and means for supplying air through the base to the said compartments.

10. Apparatus for controlling the humidity of the air in one or more compartments comprising a base having a plurality of pairs of ports in its crown each pair of ports consisting of an inlet port and an outlet port, a partition within the base dividing the interior of the said base into an air inlet chamber into which all the inlet ports open, and an air outlet chamber into which all the outlet ports open, the said partition being formed with openings equal in number to the pairs of ports in the base, a plurality of interchangeable humidity controlling units, not greater in number than the said pairs of ports, detachably assembled to the said ported crown, each unit having a pair of ports which register and make an air-tight connection with a complementary pair of ports in the base, a valve associated with each outlet port and provided with means whereby it is displaced from a position wherein it closes the said outlet port, by a conditioning unit as the latter is assembled on the said crown, a valve associated with each inlet port and a complementary partition port, a solenoid for actuating the said inlet valve to and from one extreme position wherein it closes the complementary inlet port and its other extreme position wherein it closes the said partition port, a humidostat located in one or more of the said compartments for closing an electric circuit in which the coils of said solenoids are connected, when the degree of humidity of the air in one of the said compartments reaches an undesirable value, and means for supplying air through the base to the compartment or compartments.

11. Apparatus for controlling the humidity of the air in one or more compartments, comprising a base having a plurality of pairs of ports in its crown each pair of ports consisting of an inlet port and an outlet port, a partition within the base dividing the interior of the said base into an air inlet chamber into which all the said inlet ports open, and an air outlet chamber into which all the said outlet ports open, the said partitions having a plurality of openings therein equal in number to the said pairs of ports, a duct extending from from each opening in the said partition and opening into the said inlet chamber vertically below a complementary inlet port, a plurality of interchangeable humidity controlling units, not greater in number than the said pairs of ports, detachably assembled to the said ported crown, each of said units having a pair of ports which register and make an airtight connection with a complementary pair of ports in the base, a valve associated with each outlet port and provided with means whereby it is displaced from a position wherein it closes the said outlet port, by a conditioning unit as the latter is assembled on the said crown, a valve associated with each inlet port and a complementary duct in the inlet chamber, a solenoid for actuating the said inlet valve to and from one extreme position wherein it closes the complementary inlet port and its other extreme position wherein it closes the opening from the said duct into the said inlet chamber, a humidostat located in one or more of the said compartments for closing an electric circuit in which the coils of the said solenoids are connected, when the degree of humidity of the air in one of the said compartments reaches an undesirable value, and means for supplying air through the base to the compartment or compartments.

12. Apparatus for controlling the humidity of the air in one or more compartments comprising a base divided internally by a partition into an air inlet chamber and an air outlet chamber, the said base having a plurality of inlet ports opening into the said inlet chamber and an equal number of outlet ports opening into the said outlet chamber and the said partition having an equal number of ports therein, valves controlling each inlet port and a complementary partition port, valves for controlling each outlet port, a shaft for actuating an inlet valve and a complementary outlet valve in unison, a reversible electric motor for driving the said shaft, a plurality of interchangeable humidity-controlling units detachably assembled to the base, each having a pair of ports which respectively register and make an airtight connection with an inlet port and an outlet port in the base, at least one of the said units containing air drying means and the remainder containing air wetting means, two double pole switches mounted on the base in association with each inlet port and its complementary outlet port, the poles of each switch being connected in the circuits of different windings of the complementary motor, means on each drying unit for closing one of the said switches, means on each wetting unit for closing the other of the said switches, a relay-actuated change over contact, connected in the circuit of each switch and arranged to close one or other of the said motor winding circuits, a humidostat located in one or more of the said compartments and arranged to actuate one or other of the said relays when the humidity of the air in a compartment reaches an undesirable value, and means for supplying air through the base to the said compartment or compartments.

13. Apparatus for controlling the humidity of the atmosphere in one or more compartments, comprising a ported base, a plurality of humidity-controlling units detachably assembled on the said base and having ports thereon which register with ports in the said base to enable air to be passed through the registering ports and the said units from and back to the base, at least one of the said units containing air drying means and the remainder containing air wetting means, valves for controlling the flow of air through the said units, a humidostat located in one or more of the said compartments for actuating the valves so as to allow air to pass through at least one wetting unit when the humidity of the air in a compartment becomes deficient and to allow air to pass through at least one drying unit when the humidity of the air in a compartment becomes excessive.

JOHN HARRIS.

REFERENCES CITED

The following references are of record in the file of this patent:

UNITED STATES PATENTS

| Number | Name | Date |
|---|---|---|
| 843,909 | Peters et al. | Feb. 12, 1907 |

Certificate of Correction

Patent No. 2,486,472 November 1, 1949

JOHN HARRIS

It is hereby certified that error appears in the printed specification of the above numbered patent requiring correction as follows:

Column 11, lines 9 and 10, for "position. A" read *position, a;* and that the said Letters Patent should be read with this correction therein that the same may conform to the record of the case in the Patent Office.

Signed and sealed this 4th day of April, A. D. 1950.

[SEAL]

THOMAS F. MURPHY,
*Assistant Commissioner of Patents.*